N. E. HINDS.
Hop-Scoop.
No. 222,496. Patented Dec. 9, 1879.
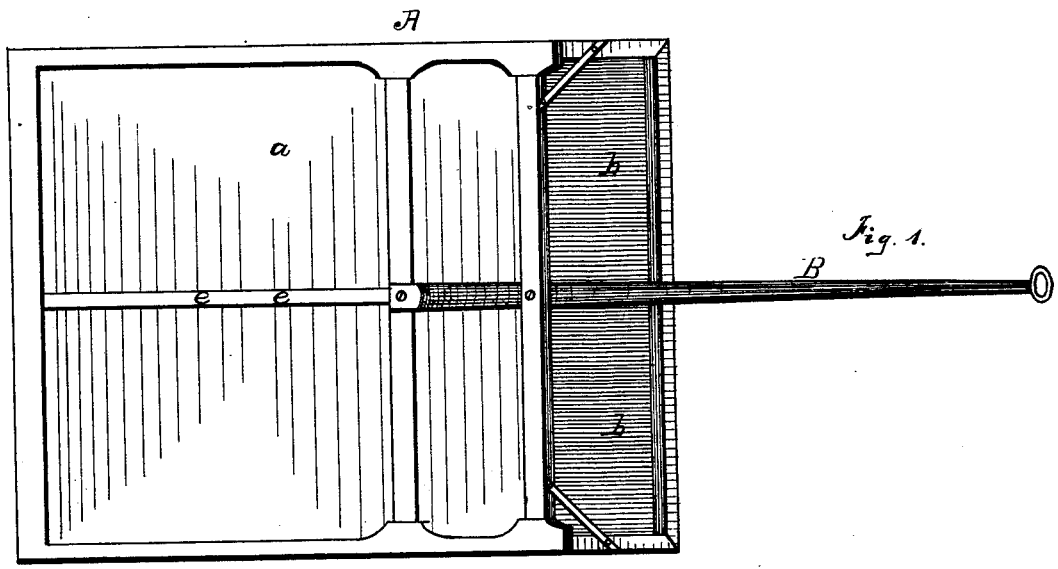
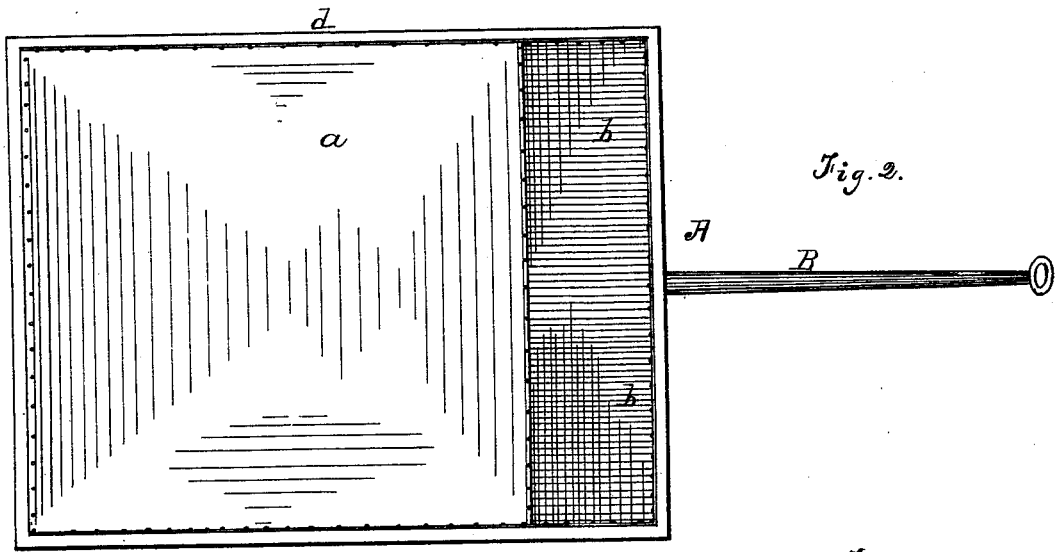
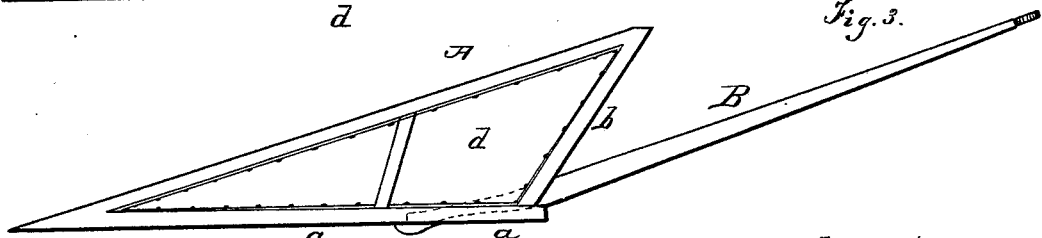

UNITED STATES PATENT OFFICE.

NEHEMIAH E. HINDS, OF COOPERSTOWN, NEW YORK.

IMPROVEMENT IN HOP-SCOOPS.

Specification forming part of Letters Patent No. 222,496, dated December 9, 1879; application filed May 21, 1879.

*To all whom it may concern:*

Be it known that I, NEHEMIAH E. HINDS, of Cooperstown, in the county of Otsego and State of New York, have invented a new and useful Improvement in Hop-Scoops, of which the following is a specification, reference being had to the accompanying drawings.

The invention relates to an improvement in hop-scoops; and it consists in the construction hereinafter described and claimed.

The object of the invention is to provide a simple and effective scoop for conveying hops from the drying-cloth of a hop-kiln to the hop-house or other receptacle.

In the accompanying drawings, Figure 1 is a bottom view, Fig. 2 is a top view, and Fig. 3 a side view, of the invention.

In the accompanying drawings, A represents the scoop, which consists of a blade, $a$, to which is attached a back, $b$, and sides $d$, the upper edges of which incline downward from the upper part of the said back $b$ to the front edge of the blade $a$. The sides, back, and blade of the scoop are constructed in the form of a skeleton-frame, properly braced, and covered with heavy drilling. In this manner the scoop can be constructed of sufficient size and strength to effectively handle the dry hops, and at the same time be light, so as not to fatigue the operator.

To the rear central portions of the scoop is secured the handle B, which extends upward and rearward, as shown. From the lower end of the handle B extends forward the bar-spring $e$, the front end of which is secured to the front edge of the scoop-frame. The purpose of this bar-spring is to sustain and to give elasticity to the body of the scoop.

It is intended to construct the blade of the scoop about three feet long and two and one-half feet wide, with sides seventeen inches high at their rear portions. A scoop of these dimensions will hold about ten or twelve pounds of dry hops.

The scoop is pressed forward, in operation, between the dry hops and dry cloth until it is about full. Then the handle B is pressed downward the length of the arm, which throws the hops within the scoop to the rear portions of same. Thus the main weight of the hops is near the handle, and the scoop can be withdrawn and moved without difficulty.

A scoop having inclined sides, as shown, is necessary in order to readily enter the hops and lighten the structure.

What I claim as my invention, and desire to secure by Letters Patent, is—

A hop-scoop consisting of the blade $a$, back $b$, inclined sides $d$, and inclined handle B, the blade, sides, and back being constructed in the form of a skeleton-frame covered with heavy drilling, substantially as specified.

In testimony that I claim the foregoing improvement in hop-scoops, as above described, I have hereunto set my hand this 8th day of May, 1878.

NEHEMIAH E. HINDS.

Witnesses:
HENRY C. HINDS,
FRED. L. PALMER.